3,149,052
NOVEL MALT PRODUCED USING COMBINATION OF HIGH TEMPERATURE KILNING AND GUM ARABIC
Eric Kneen, Elm Grove, and James William Fitzsimons, Wauwatosa, Wis., assignors to Kurth Malting Company, Milwaukee, Wis., a corporation of Wisconsin
No Drawing. Filed Dec. 6, 1962, Ser. No. 242,618
3 Claims. (Cl. 195—70)

This invention is concerned with a novel malt, and processes of producing the same, which imparts improved foam and flavor to beer made with it.

The production of beer customarily involves the mashing of ground malt with water, with or without the incorporation of an unmalted cereal adjunct, the filtration and sparging of this mash to obtain a flavorful, fermentable wort, the boiling of this wort with hops to add additional flavor, to precipitate undesirable wort constituents and to destroy undesirable microflora, the cooling of this wort and its fermentation to a beer which, after appropriate storage and filtration may be sold either in a bulk or packaged form.

The generally recognized properties of a beer that are considered quality factors, other than those identified by routine chemical analysis, are its flavor and retention of this fresh flavor, its clarity and retention of this clarity, and the degree of formation and retention of the foam produced on the surface when the beer is poured into a glass or suitable drinking container. To some extent, the visual color of the beer may be considered a significant quality factor, since it may add to, or detract from the appeal of the beverage and may suggest differences in flavor.

When malt is subjected to the high drying temperatures called kilning various reactions take place, dependent on the nature of the "green" malt itself, its moisture content, and the degree and duration of the kilning temperature applied. The results of such kilning may be measured in terms of the color and flavor in the wort after the ground malt is mashed and filtered.

The substances leading to the amber color of wort and beer are considered to result, among others, from the melanoids formed by the reaction of malt sugars with malt amino acids and, in some cases, from the caramelization of the malt sugar itself.

The contribution of malt to beer flavor is well known, and it is equally well recognized that highly kilned malts lead not only to a more highly colored beer but also to one with a more pronounced malty flavor. There is a concept that the use of such highly kilned malt in brewing may lead to a reduction of haze formation in the packaged beer during storage and a better retention of fresh flavor during storage of the packaged beer, although this part of the concept is not nearly so well defined and documented as that involving the initial malty flavor of the beer.

The production and retention of a desirable head of foam when beer is poured into a drinking container is considered to be dependent on the nature of the malt proteins and the extent of their modification during malting and brewing, as well as on the hop treatment, fermentation, and treatment of the beer in storage.

Brewers frequently regard the foam potential of their beer to be deficient and resort to the addition of foam-stabilizing material such as gum arabic. Such gum arabic may be added, for example, in the kettle at the time of boiling, during storage of the beer, or at other convenient places in the brewing procedure.

According to the present invention it has been found that the addition of a foam agent, such as gum arabic, to malt before kilning combined with the use of elevated kilning temperatures yields a novel malt which imparts to beer characteristics of flavor, foam, and stability that cannot be obtained by using either gum arabic or a similarly high kilned malt, to which the gum arabic has not been added prior to kilning, independently, added separately or in combination. The result in the beer is not additive and would not be predicted on the basis of the observed effects of the individual additions.

The foaming agent, and especially gum arabic, can be added during germination of the malt or to the green malt so produced. When the gum arabic is added during germination, it is advisable to add it during approximately the last one-half of the total germiation time. It is generally most suitable, however, to add the gum arabic to the green malt, i.e., the malt obtained after germination has been terminated and prior to kilning. In any event, the gum arabic is advisably added several hours, and generally four hours, before kilning.

The gum arabic can be added to malt while the malt is in the germinating drums or compartments, or as the malt is in transit to the kiln. For ease of application and to obtain a thorough and uniform application, the gum arabic is dissolved in water and poured or sprayed onto the malt while it is being mixed or slightly prior to mixing.

The amount of gum arabic added can be varied considerably and is usually governed by the amount of the malt to be used in producing a beer and the amount of foam sought. Less gum arabic can be added if large amounts of the malt are to be used in a beer while larger amounts of added gum arabic would be desired in malts used in lesser quantities in beer. As a practical matter, however, it is generally desirable to produce a malt containing as much added gum arabic as is possible without negating the conventional attributes and characteristics of the malt. Such a malt can then be used in an amount to produce the desired foam and maltiness in the beer with the remainder of the malt bill composed of conventional malt.

The gum arabic, while it can be added in any suitably useful and effective amount, is usually added in the range of about 0.25 to 2 pounds of gum arabic per 10 bushels of barley, with about 1 pound of gum arabic per 10 bushels of barley being recommended.

The amount of gum arabic solution which germinating malt or green malt can retain after application without dripping, together with the viscosity of the solution as the amount of gum arabic increases, introduce limiting aspects in the amount of gum arabic which can be applied conveniently. A solution containing 20 pounds of gum arabic per 100 gallons begins to be viscous and 50 pounds per 100 gallons appears to be a practical limit. About 35 to 40 pounds of gum arabic per 100 gallons of solution is about as high as can be used conveniently in commercial operations due to pumping, meter flow, spray head delivery and other similar factors.

At 24 pounds of gum arabic per 100 gallons of solution it was necessary to use 250 gallons of solution for 600 bushels of green barley malt to apply the desired amount of gum arabic. This rate, however, led to a little run-off. The total liquid addition can be in the range of from about 10 to 50 gallons of solution per 100 bushels of malt, with the amount used depending on the efficiency of the commercial mixing device. The present procedure of choice is to use about 30 gallons of solution, containing 10 pounds of gum arabic, per 100 bushels of malt on a barley basis.

Kilning of the gum arabic treated malt is more or less conventional until the terminal part of the kilning step where kilning temperatures sufficient to increase the maltiness of the product are used. The moisture content is, however, generally not above 20% when the high temperatures are used, and desirably is about 10 to 15%.

The high kilning temperatures used in cure-drying the gum arabic treated green malt are generally above 195° F., but not usually above 230° F. The high kilning temperature used will often vary, however, with the water content of the already partially kilned malt. The lower range of the high kilning temperatures would normally be used with malts containing a high moisture content such as 15–20%, at the start of high temperature kilning than malts of lower moisture content, such as 8 to 12%, which would normally be finished or cured at the higher range of the high kilning temperature. In other words, the lower the malt moisture the higher the temperature required. Kilning is terminated when the moisture content has reached the desired level of usually about 2 to 4%.

Examples showing production of the novel gum arabic treated-high kilned malt are as follows:

Example 1

A normally produced brewers' "green malt" resulting from the processing of 2500 bushels of barely was sprayed with mixing several hours before kilning with a solution containing approximately 260 lbs. of gum arabic in 800 gallons of water. The malt was then dried on the kiln in the customary fashion using low temperatures in the neighborhood of 120° F. at the beginning and finishing the kilning with high temperatures in the neighborhood of 200 to 230° F., sufficient to impart a pleasant, distinctive malty flavor and a wort color in the neighborhood of 4 to 10° Lovibond. This is in contrast to the mild malty flavor of normally kilned malt having a wort color in the neighborhood of 1.3 to 2.0° Lovibond.

Example 2

A water solution of gum arabic is prepared containing approximately 24 pounds of gum arabic per 100 gallons of solution. Five (5) hours before going to the kiln this solution is sprayed on to a well-modified green malt in sufficient volume to apply 1 pound of gum arabic per 10 bushels of barley in process. The treated malt may or may not be lightly treated with sulphur dioxide and then dried at low temperatures of about 110° F. to about 120° F. until the moisture content is reduced from 42 to 46% down to about 12 to 17%. The temperature is then raised to about 210° F. to 220° F. (depending on the malt moisture—the lower the malt moisture at this stage, the higher the temperature required). The malt is held at this temperaure for abou 7 to 8 hours to give a final malt moisture of 2.4 to 2.8%.

As with any high temperature dried malt, this novel product can be used as the sole source of malt in brewing or as a percentage of the total malt used, depending on the color and flavor desired in the beer by any individual brewer. Normally, for light colored beers, the gum arabic-highly kilned malt would be used in brewing in the range of some 10% to 30% of the total malt bill with the remainder of the malt being the normal pale malt customarily used in the production of the majority of light beers.

Examples of the use of the special gum arabic-highly kilned malt in brewing follow:

Example 3

| Brew No. | Brewing Ingredients | Beer Characteristics | | | |
|---|---|---|---|---|---|
| | | Foam Mod. Sigma [a] | Clarity Stability [b] | Flavor | Flavor Preference |
| (1) | Normal malt plus gum arabic. | 101 | 42 | Bland, sl. bitter. | 2 |
| (2) | Normal malt plus high dry malt. | 112 | 45 | Astringent, bitter. | 3 |
| (3) | Normal malt plus high dry malt and gum arabic. | 110 | 57 | ----do------ | 4 |
| (4) | Normal malt plus special gum arabic-high dry malt. | 120 | 45 | Smooth, malty. | 1 |

[a] Foam retention is determined by introducing 200 ml. of degassed beer at 25° C. into a graduated foam burette. This beer is then foamed, within the burette, by passing carbon dioxide through it by diffusion into the liquid through a porous Coors filter cylinder. Foaming is continued until the total volume of foam plus liquid is 800 ml. It is let stand 45 seconds and the liquid drained out of the burette leaving the foam within the burette. It is let stand for 200 seconds. Then the liquid that has formed is drawn off, its volume and the time for its draw-off being measured. The remaining foam in the burette is collapsed with a measured quantity of alcohol and the volume of liquid resulting is measured. The "Sigma value" is calculated by the following formula:

$$\text{Sigma} = \frac{T}{2.3 \log \frac{b+c}{c}}$$

where $T = 200 + \text{draw of time (seconds)}$.
$b = $ volume in ml. resulting from the foam collapse during the first 200 second holding time.
$c = $ volume in ml. resulting from the final collapsing of remaining foam by alcohol.

[b] Clarity stability is measured by a forcing test. A bottle of beer is held at 50° C. for 4 days followed by one day at 13° C., followed by 2 days at 0° C. At the end of this period the haze resulting from the forcing test is evaluated in a Coleman Model #9, nepho-colorimeter, and the results recorded as "Nephelos units." The higher the nephelos value the more haze that has developed in the beer and the poorer the "clarity stability."

Brew #1: The gum arabic was added in the mash at concentration of 0.063% in terms of the malt; this compares with the approximately 0.063% actually added by way of the specially treated malt.

Brew #2: The regular high dry malt had a normal malty, somewhat bitter flavor with a wort color of approximately 4.8° Lovibond and was added in the mash at the level of 25% of the total malt usage.

Brew #3: This brew received in mashing 25% of the regular high dry malt plus 0.063% gum arabic.

Brew #4: This brew received in the mash an amount of the special malt equivalent to 25% of the total malt carrying a gum arabic addition equivalent to 0.063% of the total malt used. The wort color of this supplemental malt was approximately 4.8° Lovibond.

Each of these four brews was prepared using the following procedure given in outline form:

Total malt—80 gms.
Corn flakes (gelatinized)—20 gms.
Water—320 ml.
Hold—40 mins. at 45° C.
   15 mins. to 70° C.
Hold—30 mins. at 70° C.
   5 mins. to 75° C. and at this point add 150 ml. water at 75° C.
Hold 20 mins. at 75° C.
Transfer to filter for filtration and sparging with water to give total liquid volume, after kettle boiling with hops, of 500 ml.
The wort was fermented to beer with brewers' yeast in the customary brewing fashion, taken off the yeast, the beer treated with a normal chill-proofing enzyme, stored as customary, filtered, carbonated, bottled and pasteurized.

It can be concluded from Example 3 that the use of 25% regular high dry malt in the mash, brew #2, gave good foam (112 Sigma) and normal clarity stability, but a somewhat astringent, bitter flavor which caused it to be place towards the bottom of the preference scale. Simple addition of gum arabic along with this regular high dried malt gave no improvement in foam, clarity, stability, or flavor. The addition of gum arabic to the mash, without the regular high dried malt, gave a low level of the astringent, bitter flavor but a flavor deficient in maltiness; foam was somewhat poorer and clarity stability was unchanged.

Notably, the use of the special malt, brew #4, as a substitute either for high dried malt, or gum arabic, or a combination of the two, gave markedly improved foam, and a smooth, malty, pleasant flavor causing the beer to be rated No. 1 in preference by the panel. There was no change in clarity stability. It must be concluded that the gum arabic and the malt react together before and/or during the kilning process to give a new product strikingly different in its brewing effects to what is evidenced by the individual ingredients alone or in later combinations.

Further experiments showed that when beer made with the special gum arabic-high dried malt in the 20 to 25% range of the total malt used was compared with beer made without any such additive (100% regular pale brewers' malt) the special beer showed an improvement in foam by some 10%, a slightly darker beer color, for example 3.7° Lovibond vs. 3.3° Lovibond, as good or better clarity stability, and an improved flavor in respect to smoothness, maltiness, and freedom from astringency and bitterness, and an increased "fullness."

*Example 4*

It could be concluded from the above discussion and examples that since the use of the novel special gum arabic-high dried malt imparts additional foam and flavor characteristics to a beer without rendering the beer more sensitive to becoming hazy in storage, it should be possible, by the use of such an additive, to reduce the total amount of malt used in brewing and still achieve a product comparable to regular beer, without an attendant reduction in beer foam or flavor. Such proved to be the case:

Two beers were produced on a 30 liter pilot scale. Beer A was a regular beer using normal pale malt, and no flavor or foam additive, and brewed in such a fashion that the gravity of the wort was 11.74° P. With Beer B the total malt and adjunct was reduced such that a wort Balling of only 10.86 gravity was obtained. However, in this case 15% of the special gum arabic-high dried malt prepared as in Example 1 with a color of about 6.5° Lovibond was substituted for 15% of the regular pale malt. The following brewing formulas were used:

| Beer A (Regular brew) | Beer B (Special brew) |
|---|---|
| Cooker mash:<br>1,730 gms. corn grits.<br>454 gms. malt.<br>8 liters water.<br>Main mash:<br>2,580 gms. malt.<br>6 liters water.<br>Grains bill:<br>1,730 gms. corn.<br>3,034 gms. total malt. | Cooker mash:<br>1,590 gms. corn grits.<br>353 gms. regular malt.<br>63 gms. special malt.<br>7.35 liters water.<br>Main mash:<br>2,010 gms. regular malt.<br>355 gms. special malt.<br>5.51 liters water.<br>Grains bill:<br>1,590 gms. corn.<br>2,781 gms. total malt. |

A normal cooker schedule was used at atmospheric boiling. This was added to the main mash, after an initial main mash "rest" for 1 hour at 40° C., and raised the temperature of the main mash to 70° C. in 10 minutes. It was held at 70° C. for 15 minutes for conversion, then brought to 75° C. in 10 minutes, then to the lauter tub for a 30 minute rest at 75° C., then filtered and sparged of the grains with water. Then it was put in the kettle for boiling with hops, and filtered to give a final wort volume of approximately thirty liters.

The worts were fermented to beer with brewers' yeast in the customary brewing fashion, taken off the yeast, the beer treated with a normal chill-proofing enzyme, stored as customary, filtered, carbonated, bottled and pasteurized.

Both brews were quite normal in brewhouse behavior, fermentation, and storage. The characteristics of the beers follow:

| | Beer A<br>Regular High<br>Gravity | Beer B<br>Special Low<br>Gravity |
|---|---|---|
| Color (° L) | 2.4 | 3.1. |
| Gravity | 3.27 | 2.99. |
| Initial clarity (Nephelos) | 13 | 12. |
| Alcohol (percent by weight) | 3.57 | 3.31. |
| Real extract | 4.91 | 4.52. |
| Degree of fermentation (percent) | 59.3 | 59.4. |
| Foam (mod. Sigma) | 98 | 98. |
| Clarity stability:<br>Haze in nephelos units after— | | |
| Chill alone | 12 | 12. |
| Agitation and chill | 21 | 22. |
| Heat and chill | 43 | 46. |
| Fresh flavor | "Slightly winey and slightly bitter." | "Smooth and clean." |
| Flavor preference | #2 | #1. |
| Flavor stability [1] | Normal | Markedly superior. |

[1] Flavor stability was evaluated by introducing 5 ml. of air into each 12 oz. bottle of beer and storing at 86° F. for a period of time. When opened and tasted by the flavor panel beer B, having the gum arabic-high dried malt additive, had a flavor with almost none of the characteristic objectionable "oxidized" flavor that is normally produced under these conditions, whereas the regular beer A showed the typical "winey," "oxidized" flavor characteristic of aged beer.

It is apparent, then, that the use of the specially produced novel product, the gum arabic-high dried malt, in brewing not only leads to desirable foam and flavor effect in normal brewing but permits the reduction of total malt, with attendant economics, without sacrificing foam or clarity stability. At the same time it gives an improved fresh flavor and prolongs the period of time this fresh flavor is maintained during storage of the packaged beer; i.e., the flavor stability is improved.

Although gum arabic is the only material specifically illustrated by this disclosure, it is considered that the invention is equally applicable to the use of other gums that are foaming agents and to the extent that such substances are operable and function as equivalents of gum arabic in this invention, it is intended that they are encompassed by the concept of this invention and are covered by the subsequent claims.

What is claimed is:

1. In the process of producing malt, the improvement which comprises adding about 0.25 to about 2 pounds of gum arabic to green malt from 10 bushels of barley and kilning the so-treated green malt with the terminal part of the kilning being effected at a temperature of about 195° F. to about 230° F. to increase the maltiness of the malt and produce a malt which when used in brewing gives a beer of high foam formation and retention, and improved malty flavor.

2. A novel malt which when used in brewing gives a beer with increased foam formation and retention and maltiness, characterized in that it contains about 0.25 to about 2 pounds of gum arabic, per 10 bushels of barley, added to the green malt prior to kilning, with the terminal part of the kilning being effected at a temperature of about 195° F. to about 230° F.

3. The process of producing malt, which when used in brewing gives a beer of improved foam formation and retention and improved malty flavor, comprising steeping barley, germinating the steeped barley under suitable conditions of temperature and moisture to modify the barley into malt, adding about 0.25 to about 2 pounds of gum arabic per 10 pounds of barley to the malt in the period from initial germination to just prior to kilning, and kilning the gum arabic treated malt with the terminal part of the kilning being effected at a temperature of about 195° F. to about 230° F.

References Cited in the file of this patent
UNITED STATES PATENTS

| | | |
|---|---|---|
| 500,305 | Tilden | June 27, 1893 |
| 1,084,943 | Kammer | Jan. 30, 1914 |
| 2,588,378 | Frieden et al. | Mar. 11, 1952 |
| 2,890,118 | Cantor et al. | June 9, 1959 |
| 2,947,667 | Komm | Aug. 2, 1960 |
| 3,052,548 | Nugey | Sept. 4, 1962 |